Patented Nov. 14, 1922.

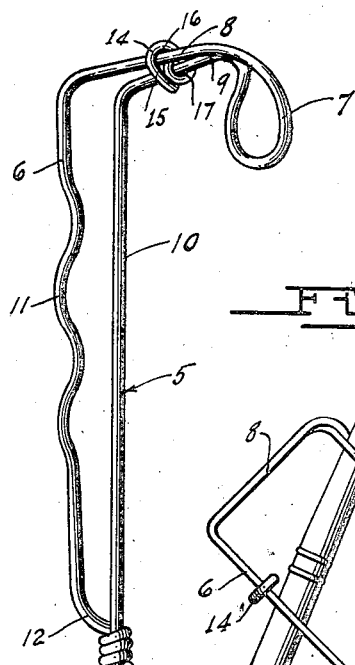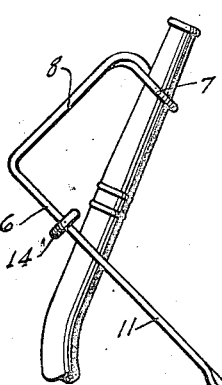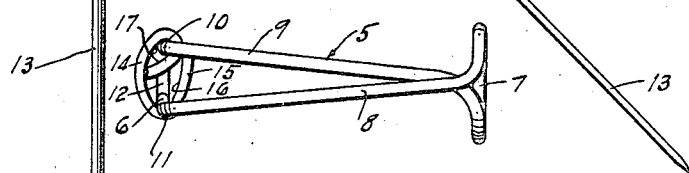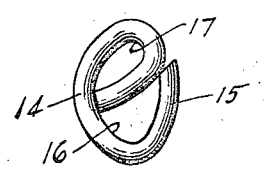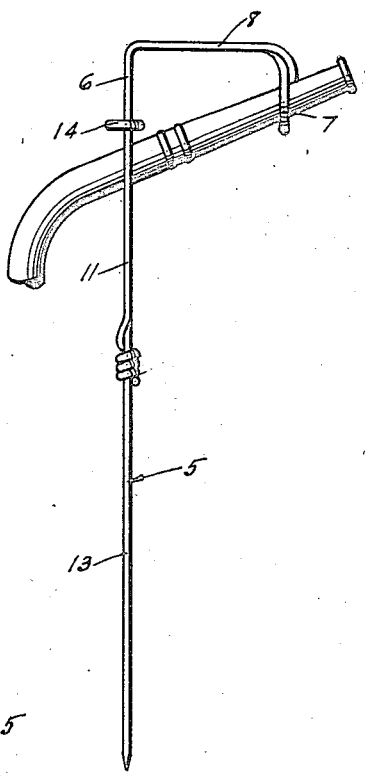

1,435,786

UNITED STATES PATENT OFFICE.

FRANK G. ALGEO, OF HUTCHINSON, KANSAS.

GARDEN-HOSE SUPPORT.

Application filed October 19, 1921. Serial No. 508,742.

*To all whom it may concern:*

Be it known that I, FRANK G. ALGEO, a citizen of the United States, residing at Hutchinson, in the county of Reno and State of Kansas, have invented certain new and useful Improvements in Garden-Hose Supports, of which the following is a specification, reference being had to the accompanying drawings.

This invention relates to hose supports and more particularly to a support for garden hose.

An object of the invention is to provide a support of this character capable of being positioned upon the lawn to hold the nozzle end portion of the hose in spaced relation to the ground.

It is another object to provide a support of this character which not only supports the nozzle of the hose, but also the portion of the hose adjacent the nozzle so that slipping of the nozzle from the support is impossible.

It is also an object of the invention to provide a support of this character including a bracket adapted to receive the nozzle of the hose, and a clamp formed adjacent the bracket for securing a portion of the hose to the support, said clamp being adapted to receive hose of various sizes.

It is a further object of the invention to provide a support of this character wherein the bracket and clamp are formed on one end of the support by a double length of material so that the bracket and clamp serve to reinforce the end of the support to which the hose is connected.

It is still a further object of the invention to provide a support of this character formed from a single length of resilient material, one end portion of the length being looped to provide a bracket for the reception of a hose nozzle, the remaining portion of said end portion being extended back upon the length and cooperating with a portion of said length to provide a pair of clamping jaws, and means slidable on said jaws for securing a portion of a hose between the jaws.

With these and other objects in view, the invention consists in the improved construction and arrangement of parts to be hereinafter more particularly described, fully claimed and illustrated in the accompanying drawings, in which:—

Figure 1 is a perspective view of a garden hose support constructed in accordance with an embodiment of the invention;

Figure 2 is a view in elevation showing the position of the support when supporting a hose substantially in a horizontal position;

Figure 3 is a view in elevation of the additional support when supporting a hose substantially in a vertical position;

Figure 4 is a top plan view of the support; and

Figure 5 is a detailed view of the adjusting ring.

Referring to the drawings, 5 designates a length of resilient material such as wire, capable of supporting the weight of the average lawn hose. The end portion 6 of said length is extended across the body portion of said length to substantially form a loop 7, said loop serving as a bracket for the reception of the nozzle of the hose. The loop 7 is then disposed substantially at right angles to the portions 8 and 9 of said length, so that the entrance to the loop is entirely closed by crossing of the portions 8 and 9. The portions 8 and 9 are bent to provide jaw members 10 and 11, said jaw members being disposed substantially at right angles to the portions 8 and 9 and parallel to the bracket or loop 7.

The jaws 10 and 11 are relatively long, the jaw 11 being crimped longitudinally thereof and having its end portion 12 extended inwardly toward the jaw 10 and coiled a number of times around the jaw 10 to substantially form a clamp through the cooperation of the jaw 10. The opposite end portion 13, that is the portion immediately beyond the wrapped portion of the jaw 11, may be made as long as desired, the extremity of the portion 13 being sharpened so as to permit the support to be inserted in the ground. When the loop member or bracket 7 is formed, the portions 8 and 9 are disposed or strung substantially in divergent relation so as to render the clamp formed by the jaws 10 and 11 resilient. In order to permit the jaws of the clamp to firmly engage the hose disposed within the clamp, a novel adjusting member is provided, said member consisting of a length of material substantially coiled to provide a ring 14. The end 15 of said length is extended inwardly and transversely of the ring to partition the ring and provide a pair of openings 16 and 17, the portion 8 and jaw 11 being adapted to pass through the opening 16, while the portion 9 and jaw 10 are adapted to pass through the opening 17. The ring 14 is adapted to be positioned upon the portions 8 and 9, which may, if desired, be extended downwardly upon the jaws 10 and 11.

In use the jaws are released by moving the ring 14 toward the bracket 7 and passing a hose between the jaw members 10 and 11, the nozzle of the hose being disposed in the bracket 7. The ring 14 is then moved toward the jaw members 10 and 11 so as to bind the jaw members in engagement with the hose, thereby preventing accidental disengagement of the hose from the support regardless of the size of the hose. The support may then be positioned so as to permit discharge of the water in the manner desired, for instance, the support may be disposed on an incline so as to hold the nozzle in a vertical position, or the support may be disposed vertically so as to hold the nozzle in an inclined position. The device may also be used to support a sprinkler in spaced relation to the lawn. In this event, the end of the hose to which the sprinkler is connected is passed through the loop 7 and the hose clamped as above stated between the jaws 10 and 11. There is no danger of the nozzle or sprinkler turning when the water pressure is increased as the crimped portions of the jaw 11 prevent the hose from accidentally sliding between the jaws and disengagement is prevented by means of the adjusting means 14. It may also be used to attach a hose to a wire fence if it is desired to maintain the hose at a greater height. This is accomplished by placing the support on a fence so that a portion of the fence is disposed between the body portion or jaws of the support and the ring 14.

From the foregoing it will be readily seen that this invention provides a novel form of hose support capable of holding a hose of any size, in a variety of positions without danger of the hose becoming accidentally disengaged, or danger of the support falling. Furthermore, in the formation of the bracket member and the clamps through the medium of the jaws 10 and 11 the length of material is doubled at these portions so that the holder is substantially reinforced at the point of greatest strain thereby eliminating the danger of bending under weight of the hose.

What is claimed is:—

1. A hose support consisting of a length of resilient material having one end portion thereof extended back upon the major portion of said length to provide a pair of arms, said arms being crossed to provide a loop, the portion of said arms adjacent the loop being extended at right angles to the major portion of said length and the remainder of said end portion, the remainder of said end portion being extended substantially in parallel relation to the major portion of the length and having its extremity secured to said major portion of the length to provide an adjustable clamp member, and an adjusting member slidable on said arms, the major portion of the length, and said end portion for adjusting said clamp member relative to the major portion of said length.

2. A hose support consisting of a length of resilient material, one end portion of said length being adapted to engage the ground, the opposite end portion of the length being extended back upon the grounds engaging end portion to provide a pair of arms, the extremity of the second mentioned end portion being secured to the first mentioned end portion, said arms being crossed at their bight portion to provide a loop, the loop being extended at right angles to the arms, the portion of the arms adjacent the loop being extended at right angles to the major portion of said arms, said second mentioned end portion of the length being disposed substantially in parallel relation to the ground engaging portion of the length to provide a resilient clamping member, and a ring slidable on said end portions, said loop and the secured end of the second mentioned end portion preventing disengagement of the ring from the arms.

3. A hose support of the character described consisting of a length of wire, one end portion of said wire being arranged to pentrate the ground, the opposite end portion of the wire being extended back upon and in spaced relation to the ground penetrating end portion of the wire, said second mentioned end portion being crimped and having its ends extended inwardly and secured to the ground penetrating end portion in spaced relation to the extremity of the ground penetrating end portion to provide a pair of clamping arms, the portion of said arms adjacent their bight portion being extended outwardly in angular relation to the major portion of said arms and crossed to provide a loop, said loop being disposed in spaced parallel relation to the major portion of the arms, and a ring embracing said arms, said ring being slidable on the arms from the loop to the secured end of the second mentioned end portion of the wire.

In testimony whereof I hereunto affix my signature.

FRANK G. ALGEO.